J. B. GEORGE & O. STELZIG.
STALK CHOPPING DEVICE.
APPLICATION FILED DEC. 30, 1911. RENEWED OCT. 28, 1912.
1,052,240.
Patented Feb. 4, 1913.
2 SHEETS—SHEET 1.
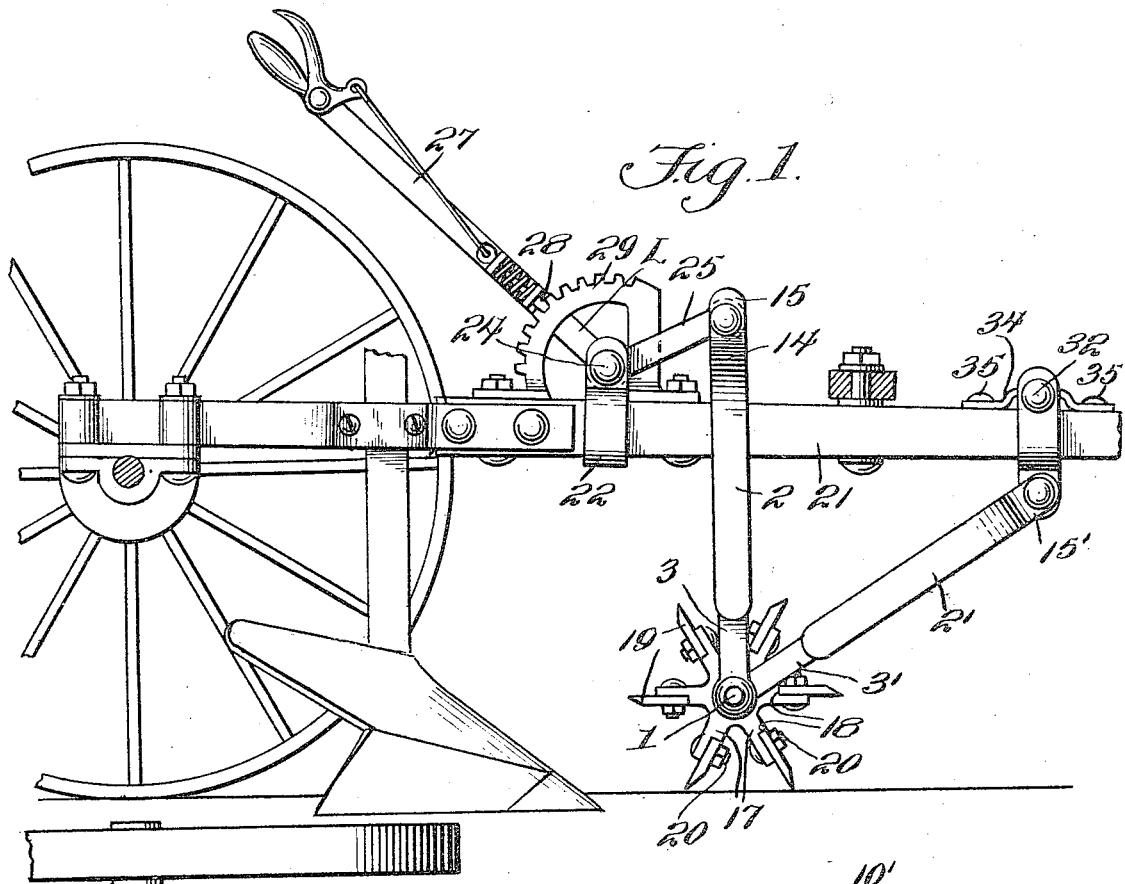
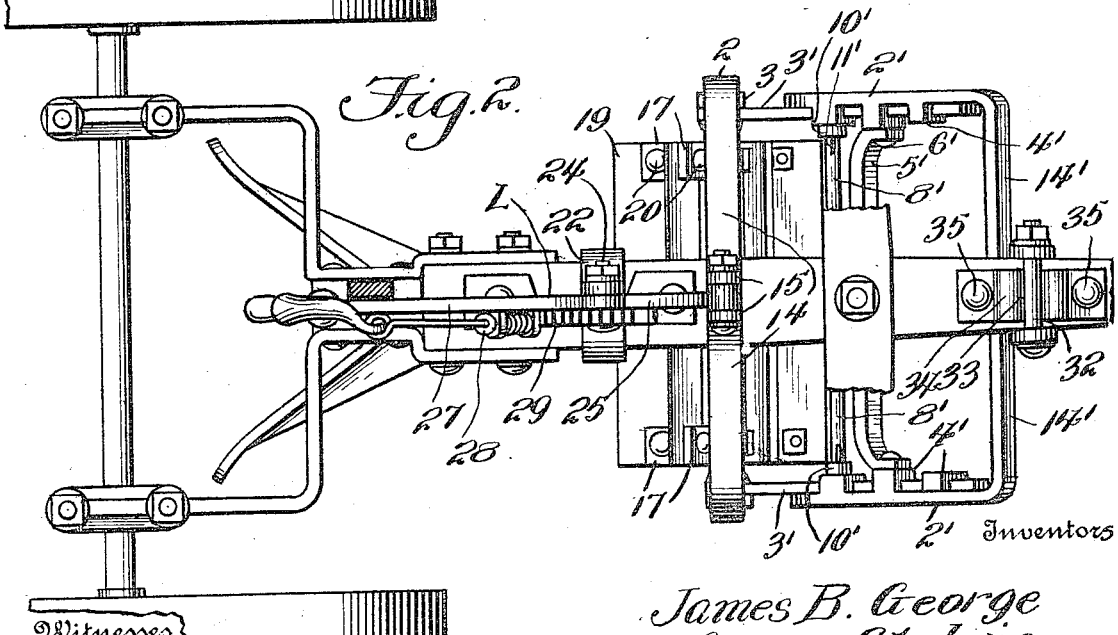

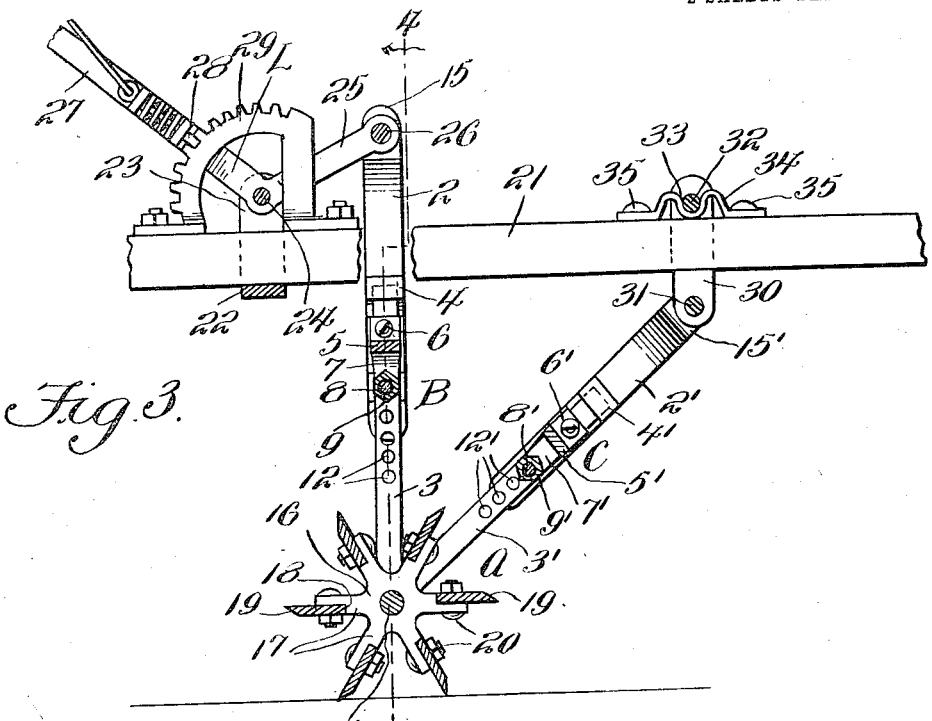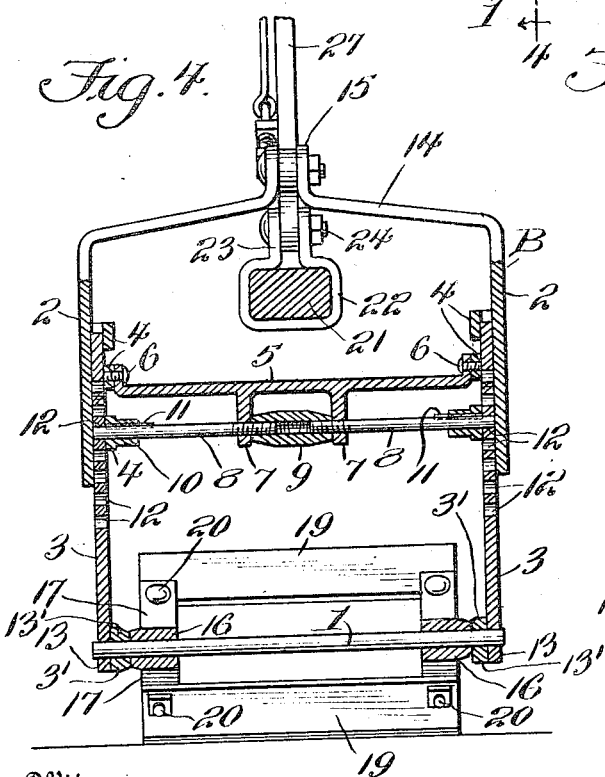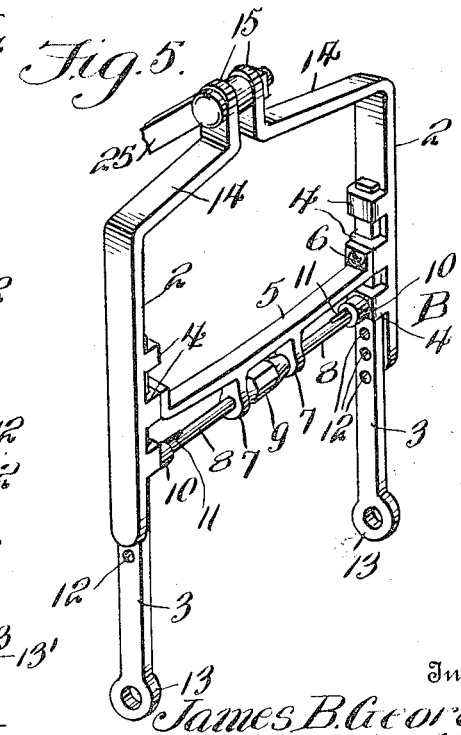

UNITED STATES PATENT OFFICE.

JAMES B. GEORGE AND OSCAR STELZIG, OF HAMLIN, TEXAS.

STALK-CHOPPING DEVICE.

1,052,240.

Specification of Letters Patent. Patented Feb. 4, 1913.

Application filed December 30, 1911, Serial No. 668,729. Renewed October 28, 1912. Serial No. 728,246.

*To all whom it may concern:*

Be it known that we, JAMES B. GEORGE and OSCAR STELZIG, citizens of the United States, residing at Hamlin, in the county of Jones and State of Texas, have invented certain new and useful Improvements in Stalk-Chopping Devices, of which the following is a specification.

This invention relates to stalk chopping devices, and it has particular reference to a device of this class which may be conveniently applied to and used in connection with a wheel plow or similar implement whereby the stalks, subsequent to being chopped into bits will be plowed under and covered with soil, thereby hastening the decay of the stalks and increasing the value thereof for fertilizing purposes.

The principal object of the invention is to produce a simple and improved stalk chopping device which may be conveniently mounted on the tongue of an ordinary wheel plow or similar implement, means being provided whereby the stalk cutting device may be thrown into or out of operation and whereby it may be held in ground engaging position with the requisite amount of pressure to insure effective work.

A further object of the invention is to provide a simple and improved construction whereby the stalk cutting attachment may be applied to and used in connection with vehicle tongues that are positioned at various elevations above the ground, the supporting and draft elements of the stalk cutting device being made adjustable for the purpose set forth.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation showing the improved stalk cutting device mounted upon the tongue of a wheel plow of conventional pattern. Fig. 2 is a top plan view of the same. Fig. 3 is a vertical longitudinal sectional view, showing the device applied to a tongue at a greater elevation above the ground than in Fig. 1, and showing how the parts may be adjusted to meet these conditions. Fig. 4 is a vertical transverse sectional view taken on the line 4—4 in Fig. 3. Fig. 5 is a perspective detail view showing the supporting frame, detached.

Corresponding parts in the several figures are denoted by like characters of reference.

The stalk cutting implement shown at A is mounted for rotation on a shaft or axle 1, mounted in suitable bearings afforded by a supporting frame B and a draft frame C. The supporting frame B includes upper and lower side members 2 and 3, the former being provided upon their inner opposed faces with keepers 4 wherein the lower side members 3 are slidably supported. The upper side members 2, 2 are connected together by means of a cross bar or brace 5 which may be secured by means of screws or bolts 6 in some of the keepers 4 so as not to obstruct the sliding movement of the lower side members 3. The cross bar 5 is provided with downwardly extending apertured lugs 7 for the passage of screw threaded rods 8, the inner ends of which are connected together by means of a turn buckle 9 confined between the lugs 8. The outer ends of the rods 8 are guided through collars 10 on some of the keepers and are preferably provided with non-circular portions formed, for instance, by splines 11 operating in the collars 10 to prevent the rods from turning therein, thus enabling the said rods to be effectively operated by means of the turn buckle for the purpose of moving them toward or from each other, as will be readily understood. The outer extremities of the rods 8 which extend through the walls of the keepers 4 having the collars 10 are adapted to engage apertures 12 in the slidable side members 3, which latter may thus be securely retained and supported at various adjustments. The side members 3 are provided at their lower ends with eyes or openings 13 for the reception of the shaft 1. The upper extremities of the upper side members 2 are bent toward each other to form brackets 14 having upwardly extending terminal lugs 15.

The construction of the draft frame C is in every respect identical with that of the supporting frame B, being composed of upper and lower side members 2', 3', the former of which are provided on their inner faces with keepers 4' wherein the members 3' are slidably supported. Some of the keepers 4' are connected together by a cross bar or brace 5' secured in position on some of the keepers by set screws 6' having downwardly extending lugs 7' for the reception of rods 8', the inner ends of which are screw threaded and are connected together by means of a turn buckle 9'. The outer ends of the rod 8' are provided with splines 11' guided through collars 10' on some of the keepers 4' and are adapted to engage apertures 12' in the lower side members 3', which latter are provided at their lower ends with eyes or apertures 13' for the passage of the shaft 1. The lower side members of the draft frame have been shown as being positioned adjacent to the inner faces of the lower side members of the supporting frame. The upper ends of the upper side members 2' of the draft frame are bent in the direction of each other to form brackets 14' having terminal lugs 15'.

The stalk cutting element A which has been shown as mounted upon the shaft 1 is composed of heads 16 having radially extending arms or spokes 17 provided with shoulders 18 to support the cutting blades or knives 19, which latter may be secured upon the radial arms or spokes by fastening members, such as bolts 20. The stalk cutting element is adapted to be rotated by engagement with the stalks lying on the ground, the knives or cutting blades being positioned sufficiently close together to cause the stalks to be cut into bits of suitable dimensions to be readily plowed under.

The improved device has been shown in Figs. 1 and 3 as being applied to the tongue 21 of a wheel plow, which latter may be of any desired type or pattern. A clamp 22 mounted on the tongue is provided with upstanding lugs 23 connected by a clamping bolt 24, which latter also constitutes the fulcrum of a bell crank lever L having a short arm 25 with which the upper ends of the side members of the supporting frame B are connected by means of a pivot member, such as a bolt 26, passing through the upstanding ears or lugs 15. The long arm 27 of the bell crank constitutes a handle whereby it may be conveniently operated to raise or lower the supporting frame, said handle member being provided with a spring actuated stop member 28 engaging a quadrant 29 for the purpose of securing the lever and related parts in adjusted position. A second clamp 30 suitably mounted on the tongue 21 is connected by a pivot member, such as a bolt 31, with the lugs 15' of the side members of the draft frame.

To prevent the clamp 30 from sliding along the tongue 21, said clamp includes a transverse bolt 32 which is fitted in a seat 33 of a block or strap 34 which is suitably bolted or otherwise secured upon the tongue by fastening members 35.

As will be readily seen from the foregoing description taken in connection with the drawings hereto annexed, the arrangement of the improved stalk cutting device is such that by manipulating the bell crank lever L, it may be raised from or lowered into engagement with the ground, it being understood that the tongue is straddled by the supporting frame B, while the draft frame C is disposed beneath the tongue. In traveling over the ground, the cutting element will be rotated by contact with the stalks, the latter being cut and chopped, as will be readily understood, and subsequently plowed under by the plow which follows behind.

In transferring the stalk cutting device from one implement to another in which the tongue is located at a different elevation, the supporting and draft frames may be lengthened or shortened by first operating the turn buckles to disengage the rods 8 from the apertures in the lower side members of the frames, after which said lower side members may be slid or moved within the supporting guides or keepers to the desired position, after which the turn buckles are manipulated to restore the rods 8 to engagement with some of the recesses in the said lower side members, which will thus be firmly secured in adjusted position.

Having thus described the invention, what is claimed as new, is:—

1. In a stalk cutting attachment for wheel plows, the combination with a draft tongue, of a supporting frame straddling said tongue, a clamp engaging the tongue, a draft frame pivotally connected with said clamp beneath the tongue, said supporting frame and draft frame including side members having bearings at their lower ends, the side members of the draft frame being positioned adjacent to the inner faces of the supporting frame, a shaft supported in the bearings of the supporting frame and the draft frame, and a revolving stalk cutting element carried by the said shaft; and lever means mounted on the tongue and connected with the supporting frame for effecting vertical adjustment of the stalk cutting element.

2. In a stalk cutting device, the combination with a revolving stalk cutting element and a shaft supporting the same, of supporting means for said shaft comprising a supporting frame and a draft frame, each of said frames including upper and lower side members, the lower side members being supported slidably with reference to the upper side members and equipped with bearings for the shaft.

3. In a stalk cutting device, a revolving stalk cutting element, a supporting shaft for the same, and supporting means for said shaft including a frame comprising upper and lower side members, the upper side members being provided with keepers in which the lower side members are movably supported, said lower side members being provided with bearings for the shaft supporting the rotary chopping element, and means associated with the upper side members for retaining the lower side members at various adjustments.

4. In a stalk cutting device, a rotary chopping element, a shaft supporting the same, supporting means for said shaft including a supporting frame and a draft frame, said supporting frame and draft frame being of similar construction, and each comprising upper side members having keepers on their inner faces, lower side members slidable in said keepers and having bearings for the shaft of the rotary cutting element, a cross brace secured upon some of the keepers and connecting the upper side members, said cross brace being provided with downwardly extending lugs, threaded rods guided through said lugs and operating through some of the keepers, and a turn buckle positioned between the lugs and engaging the threaded rods; the lower side members being provided with apertures to receive the outer ends of the threaded rods, and means being provided to prevent said rods from rotating when actuated by the turn buckle.

In testimony whereof we affix our signatures in presence of two witnesses.

JAMES B. GEORGE.
OSCAR STELZIG.

Witnesses:
C. P. CHASTAIN,
S. T. LONG.